(No Model.)
J. B. & R. JOHNS.
METHOD OF MAKING BOTTLES.
No. 432,412. Patented July 15, 1890.
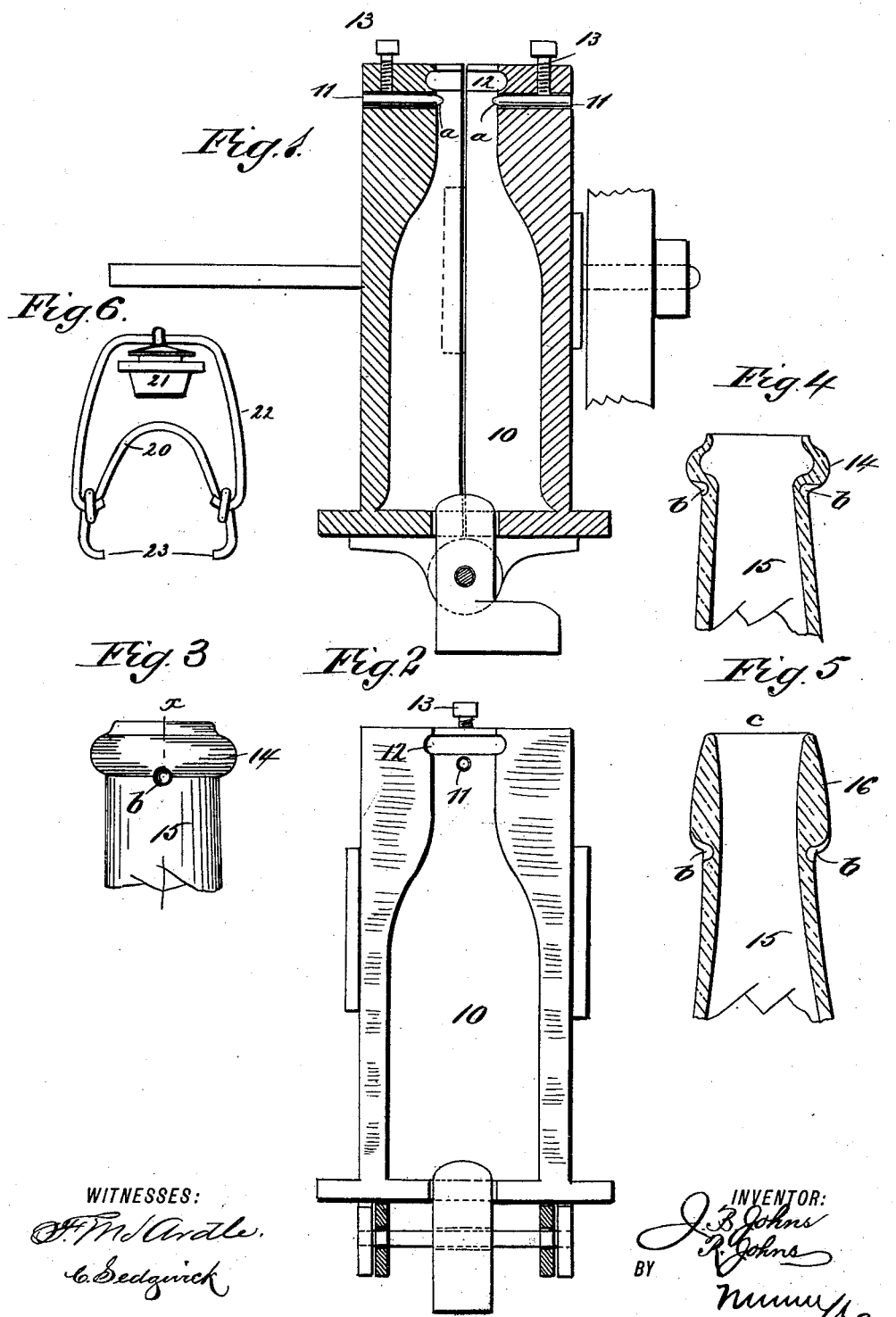
WITNESSES:
INVENTOR:
J. B. Johns
R. Johns
BY
ATTORNEYS.
THE NORRIS PETERS CO., PHOTO-LITHO., WASHINGTON, D. C.

UNITED STATES PATENT OFFICE.

JOHN B. JOHNS AND ROBERT JOHNS, OF FINDLAY, OHIO.

METHOD OF MAKING BOTTLES.

SPECIFICATION forming part of Letters Patent No. 432,412, dated July 15, 1890.

Application filed May 4, 1889. Serial No. 309,648. (No model.)

*To all whom it may concern:*

Be it known that we, JOHN B. JOHNS and ROBERT JOHNS, both of Findlay, in the county of Hancock and State of Ohio, have invented a new and Improved Method of Making Bottles, of which the following is a full, clear, and exact description.

The object of our invention is to provide for the cheap manufacture of a bottle to which the lever of a stopper-bail may be quickly and easily secured.

Prior to our invention the said lever has been connected to the bottle-neck by means of a wire passed around said neck immediately beneath the head; or the lever has been provided with inwardly-extending spurs or points arranged to rest within recesses formed in the bottle-head at the time when said head was applied to the bottle-neck. The first of the constructions just referred to involves considerable expense in the application of the stopper to the bottle, while it is exceedingly expensive to produce a bottle with the recesses formed in the head, inasmuch as the formation of the recesses in the head materially increases the labor necessary to produce the bottle. By means of our invention, however, which consists in the formation of a ring near the upper end of the bottle-neck at the time the bottle-body is blown, and at the same time in producing recesses in the peripheral face of the neck just below the said ring, and in finally applying the bottle-head, we produce a bottle at an extremely low cost.

Reference is to be had to the accompanying drawings, forming a part of this specification, in which similar figures and letters of reference indicate corresponding parts in all the views.

Figure 1 is a sectional elevation of a mold employed in our method of making bottles. Fig. 2 is a view of one of the mold-sections. Fig. 3 is a view of the bottle-neck as it appears after leaving the mold. Fig. 4 is a sectional view on line *x x* of Fig. 3. Fig. 5 is a view of a portion of a completed bottle, and Fig. 6 is a view of the stopper employed in connection with the bottle.

In the drawings, 10 represents a mold of ordinary form; but in carrying out our method of manufacturing bottles we make said molds with apertures *a*, in which there are inserted pins 11, which extend inward slightly beyond the inner face of the mold, and just above the apertures *a* we form an annular groove 12. The pins 11 are held to place by set-screws 13.

In operation the bottle is blown in the mold 10 in the ordinary manner, and leaves the mold with an annular projection 14 near the top of the neck 15, and just beneath this projection there are formed recesses *b*, said recesses being produced by the points of the pins 11. After the bottle has been molded, as above described, the head is applied in the usual manner, the upper portion of the completed bottle appearing as represented in Fig. 5, in which 16 represents the head.

By the method above set forth we secure a bottle in which the upper edge *c* of the head is always a given and required distance above the indentations or recesses *b*.

In Fig. 6 we represent a stopper, such as the one employed in connection with our bottle, 20 representing the locking-lever, 21 the stopper proper, 22 the bolt which is connected to the stopper and to the lever, and 23 the inwardly-extending points of the lever, which said points rest within the recesses *b* when the stopper is applied to the bottle; and this application of the stopper, it will be understood, may be readily brought about by inserting one of the points 23 in one of the recesses *b* and then springing the other point 23 into the opposing recess *b*.

Having thus described our invention, what we claim as new, and desire to secure by Letters Patent, is—

The herein-described method of forming bottles, which consists in molding the bottle with a ring 14, and with recesses *b* below said ring, and in then applying the head, substantially as described.

JOHN B. JOHNS.
ROBERT JOHNS.

Witnesses:
PETER HAVEY,
J. M. PLATT.